US011435716B2

(12) United States Patent
Iriguchi et al.

(10) Patent No.: US 11,435,716 B2
(45) Date of Patent: Sep. 6, 2022

(54) INFORMATION COLLECTING DEVICE AND METHOD FOR COLLECTING ENGINEERING AND DEVICE INFORMATION TO MAINTAIN AN UPDATED INFORMATION DATABASE OF DEVICES IN A PLANT

(71) Applicant: YOKOGAWA ELECTRIC CORPORATION, Tokyo (JP)

(72) Inventors: Hiroshi Iriguchi, Musashino (JP); Eiji Nagai, Musashino (JP); Masatoshi Takubo, Musashino (JP); Jisong Zhang, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 16/138,412

(22) Filed: Sep. 21, 2018

(65) Prior Publication Data

US 2019/0094832 A1 Mar. 28, 2019

(30) Foreign Application Priority Data

Sep. 22, 2017 (JP) .............................. JP2017-182093

(51) Int. Cl.
*G05B 19/418* (2006.01)
*G05B 19/05* (2006.01)
*G05B 19/4065* (2006.01)

(52) U.S. Cl.
CPC ....... *G05B 19/058* (2013.01); *G05B 19/4065* (2013.01); *G05B 19/4185* (2013.01);
(Continued)

(58) Field of Classification Search
CPC .............. G05B 19/058; G05B 19/4185; G05B 19/4065; G05B 2219/15004;
(Continued)

(56) References Cited

U.S. PATENT DOCUMENTS

2011/0264244 A1* 10/2011 Pettigrew ........... G05B 19/4185
700/89
2012/0089239 A1* 4/2012 Sentgeorge ............. H04L 41/12
700/2

(Continued)

FOREIGN PATENT DOCUMENTS

JP 2014174765 A 9/2014
JP 5652444 B2 1/2015
WO WO2001084256 * 8/2001 ........... G05B 19/408

OTHER PUBLICATIONS

Extended European Search Report issued in European Application No. 18195906.5; dated Feb. 13, 2019 (10 pages).

*Primary Examiner* — Kenneth M Lo
*Assistant Examiner* — Jonathan Michael Skrzycki
(74) *Attorney, Agent, or Firm* — Osha Bergman Watanabe & Burton LLP

(57) ABSTRACT

An information collecting device controls a plant based on process data acquired from controllers and field devices connected to the controllers. The information collecting device includes an arithmetic controller and an update controller. The arithmetic controller collects first information which is engineering information of the plant and second information which is device information from a controller, a field device or a combination of both selected from the controllers and the field devices. The update controller generates third information based on a definition in which the first information and the second information are set in advance, and updates the third information in a storage based on a preset update cycle.

10 Claims, 9 Drawing Sheets

(52) U.S. Cl.
CPC .............. *G05B 2219/15004* (2013.01); *G05B 2219/23193* (2013.01); *G05B 2219/23336* (2013.01); *G05B 2219/25068* (2013.01); *G05B 2219/25074* (2013.01)

(58) Field of Classification Search
CPC ........... G05B 2219/25074; G05B 2219/25068; G05B 2219/23336; G05B 2219/23193; G05B 19/4183
See application file for complete search history.

(56) References Cited

U.S. PATENT DOCUMENTS

| | | | | |
|---|---|---|---|---|
| 2012/0311071 | A1* | 12/2012 | Karaffa | G05B 19/41845 709/217 |
| 2014/0067089 | A1* | 3/2014 | Kanbe | G05B 19/41845 700/73 |
| 2015/0039130 | A1* | 2/2015 | Banerjee | G05B 15/02 700/275 |
| 2018/0210429 | A1* | 7/2018 | Jundt | G06K 7/10366 |
| 2018/0231959 | A1* | 8/2018 | Jundt | G05B 19/414 |
| 2019/0012246 | A1* | 1/2019 | Liu | G06F 11/221 |

\* cited by examiner

*FIG. 5*

| CONTROLLER | MODEL NUMBER | SERIAL NUMBER | SOFTWARE | ... |
|---|---|---|---|---|
| IOM1 | | | | |
| IOM2 | | | | |
| IOM3 | | | | |
| ⋮ | | | | |

| HMI | MODEL NUMBER | ... | ... | ... |
|---|---|---|---|---|
| SOFTWARE 1 | | | | |
| SOFTWARE 2 | | | | |
| SOFTWARE 3 | | | | |
| ⋮ | | | | |

INFORMATION COLLECTING DEVICE AND METHOD FOR COLLECTING ENGINEERING AND DEVICE INFORMATION TO MAINTAIN AN UPDATED INFORMATION DATABASE OF DEVICES IN A PLANT

CROSS-REFERENCE TO RELATED APPLICATION

The present application claims priority from Japanese Patent Application No. 2017-182093 filed on Sep. 22, 2017, the entire content of which is incorporated herein by reference.

BACKGROUND

Technical Field

The present invention relates to a process control system or a safety instrumented system, and in particular, provides an information collecting device for collecting configuration information (for example, device manufacturing information, a serial number, version information of security software) related to devices such as a controller, a field device, and a PC installed in a plant.

Related Art

In a plant performing petroleum refining, petrochemical processes, and water treatment processes of water supply and sewage, a process control system 1 controls state quantities such as pressure, temperature, and a flow rate in industrial processes. The process control system 1 generally includes a control system such as a distributed control system (DCS) and a safety system such as a safe instrumented system (SIS) to perform advanced control while ensuring safety.

In the above distributed control system, field devices 151 to 153, 161 to 163 such as a flowmeter and a transmitter and controllers 131 to 133 that control these field devices are connected via a network, and the controllers 131 to 133 collect data measured by the field devices 151 to 153, 161 to 163 to control these field devices based on the collected data, so as to control the state quantities.

The above safety instrumented system is provided with the field devices 151 to 153, 161 to 163 that detect gas, flame, heat, smoke, and the like, and an alarm is output based on detection results of the field devices 151 to 153, 161 to 163. The safety instrumented system aims at protecting facilities in the plant while preventing injuries and environmental pollution by stopping the plant in a safe state based on an emergency level of the alarm.

In recent years, the process control system 1 in a plant is configured by hundreds of thousands of the controllers 131 to 133 and the field devices 151 to 153, 161 to 163 (referred to as "devices" hereinafter). When the plant is remodeled, a device installed in any location of the plant is reworked. The process control system 1 manages detailed information (for example, information indicating a type, a model name, a connection position information, and update date and time information, regarding modules connected to the controllers 131 to 133, referred to as "configuration information" hereinafter) of devices in the operating process control system 1 via such as a database on the network, as history information of the reworking. Accordingly, a plant engineer or a maintenance staff maintains the plant by specifying a location where a problem occurs to the process control system 1 using the configuration information.

There are examples of a method for collecting the configuration information from devices installed in the plant, which includes a method of collecting the configuration information using a device list created upon introducing or remodeling of a system of the plant, and a method of collecting the configuration information automatically from field devices.

For example, JP-B-5652444 discloses a method for collecting device information by comparing devices in a plant with specification information of the devices.

When the method of collecting the configuration information using a device list created upon introducing or remodeling of a plant is used, the device list to be used may not coincide with the operating process control system 1. This makes it necessary for the maintenance staff to check the configuration information for each device installed in the plant, making work troublesome for the maintenance staff.

When the method of collecting the configuration information automatically from field devices is used, following occurs.

The configuration information may not be transmitted since a device to be collected of configuration information has no function of transmitting configuration information thereof, and configuration information for maintenance cannot be collected.

The maintenance staff has to check a device installed in the plant directly since the device does not possess position information or connection information thereof for such as maintenance.

The configuration information cannot be collected due to an operating state of a device such as maintenance of the device or a problem occurred to a network connecting devices.

Thus, immediate response cannot be made when an abnormality occurs to a device since all information of devices constituting the process control system 1 cannot be managed. Further, not only burden on the maintenance staff increases, but also work thereof becomes troublesome.

SUMMARY

One or more embodiments of the present invention provide an information collecting device capable of collecting configuration information related to devices constituting the process control system 1 without checking the devices directly by such as a maintenance staff.

According to one or more embodiments, an information collecting device controls a plant based on process data acquired from controllers and field devices connected to the controllers. The information collecting device includes a first collecting unit, a second collecting unit and an update control unit (controller). The first collecting unit collects first information which is engineering information of the plant. The second collecting unit collects second information which is device information from a controller, a field device or a combination of both selected from the controllers and the field devices. The update control unit generates third information based on a definition in which the first information and the second information are set in advance, and updates the third information in a storage unit based on a preset update cycle.

According to one or more embodiments, in the information collecting device according to the first aspect, upon receiving an instruction to collect the first information from the update control unit, the first collecting unit selects and collects the first information from the engineering information, and sets first identification information for the update control unit to identify the first information.

According to one or more embodiments, in the information collecting device according to the first aspect or the second aspect, upon receiving an instruction to collect the second information from the update control unit, the second collecting unit selects and collects the second information from the device information, and sets second identification information for the update control unit to identify the second information.

According to one or more embodiments, in the information collecting device according to any one of the first aspect to the third aspect, the second collecting unit includes a determination unit that determines whether the second information is collected from the controller or the field device. The second collecting unit adds a determination result of the determination unit to the second information, and transmits the second information to the update control unit.

According to one or more embodiments, in the information collecting device according to the fourth aspect, the determination result includes acquisition success, acquisition failure, and ignorance. The acquisition success indicates that the second information is collected. The acquisition failure indicates that at least a part of the second information is not acquired. The ignorance indicates that third information before update stored in the storage unit is maintained even when the second information is not acquired.

According to one or more embodiments, in the information collecting device according to any one of the first aspect to the fifth aspect, the device information includes at least one of a serial number, a type of software, license information, connection information or position information between the controller and the field device.

According to one or more embodiments, in the information collecting device according to any one of the first aspect to the sixth aspect, the update control unit includes an instruction unit, an identification unit and a generation unit. The instruction unit transmits, to the first collecting unit and the second collecting unit, an instruction to collect configuration information from the controller or the field device selected in advance or from a combination of both of the controller and the field device. The identification unit identifies the first identification information and the second identification information assigned to the received first information and the second information, respectively. The generation unit generates the third information by combining the first information and the second information based on the identification information identified by the identification unit.

According to one or more embodiments, in the information collecting device according to the seventh aspect, the generation unit generates the third information by combining the first information and the second information when the identification unit identifies that at least a part of the same identification information is set in both of the first and second identification information.

According to one or more embodiments, in the information collecting device according to any one of the first aspect to the eighth aspect, the update control unit sets a correction range of the first and second information, based on at least one of a target device and a target type of a device.

One or more embodiments provide a method for collecting information in an information collecting device that controls a plant based on process data acquired from controllers and field devices connected to the controllers. The method includes: collecting first information which is engineering information of the plant; collecting second information which is device information from a controller, a field device or a combination of both selected from the controllers and the field devices; and generating third information based on a preset definition in which the first information and the second information are set in advance, and updating the third information in a storage unit based on a preset update cycle.

In one or more embodiments of the information collecting device for controlling a plant based on process data acquired from controllers and field devices connected to the controllers, the information collecting device includes a first collecting unit that collects engineering information of the plant as first information, a second collecting unit that collects device information from a controller, a field device or a combination of both selected from the controllers and the field devices as second information, an update control unit that generates third information based on a preset definition in which the first information and the second information are set in advance and updates the third information to a storage unit based on a preset update cycle, and a storage unit that stores the third information, configuration information related to devices constituting the process control system can be acquired without checking the devices directly by such as a maintenance staff.

BRIEF DESCRIPTION OF DRAWINGS

FIG. 5 is a diagram illustrating examples of configuration information according to one or more embodiments of the present invention;

DETAILED DESCRIPTION

Overview of Process Control System

Figure 1:
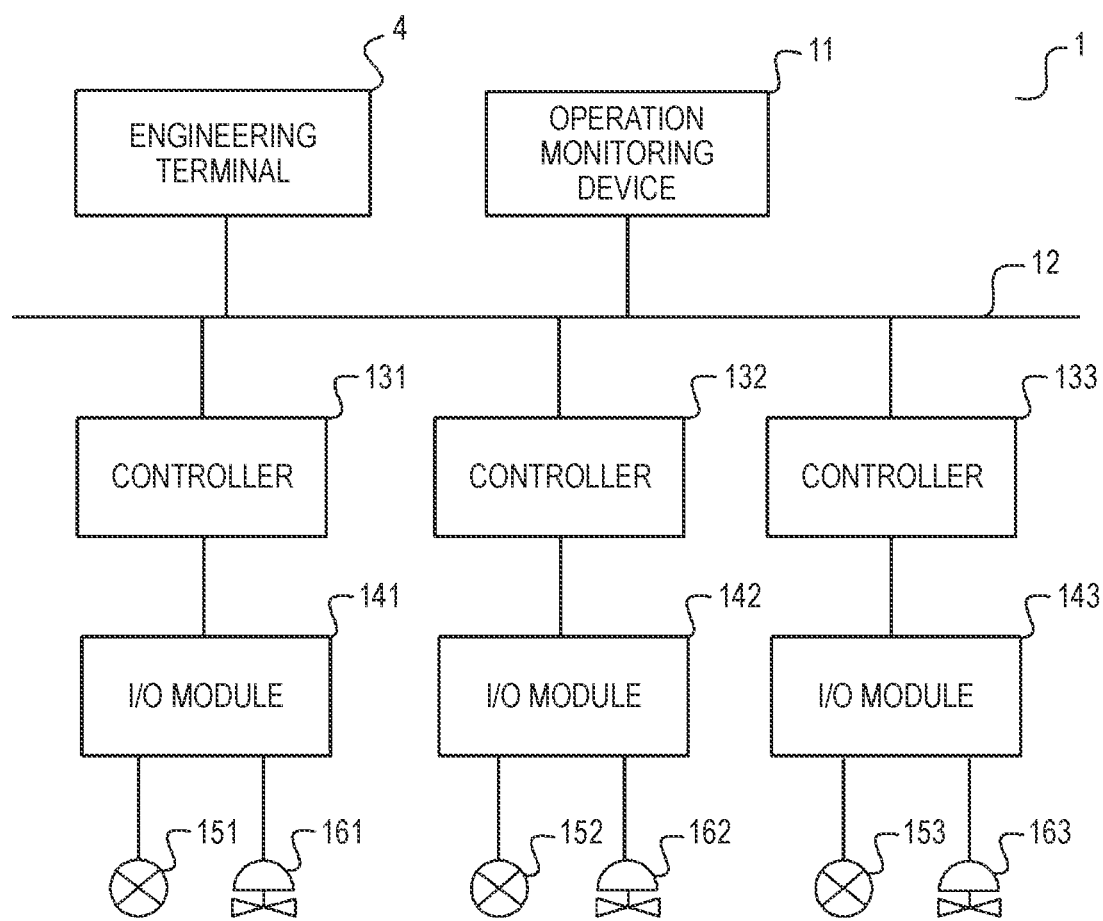
FIG. 1 is a configuration diagram illustrating a configuration example of a general process control system.
Figure 2:
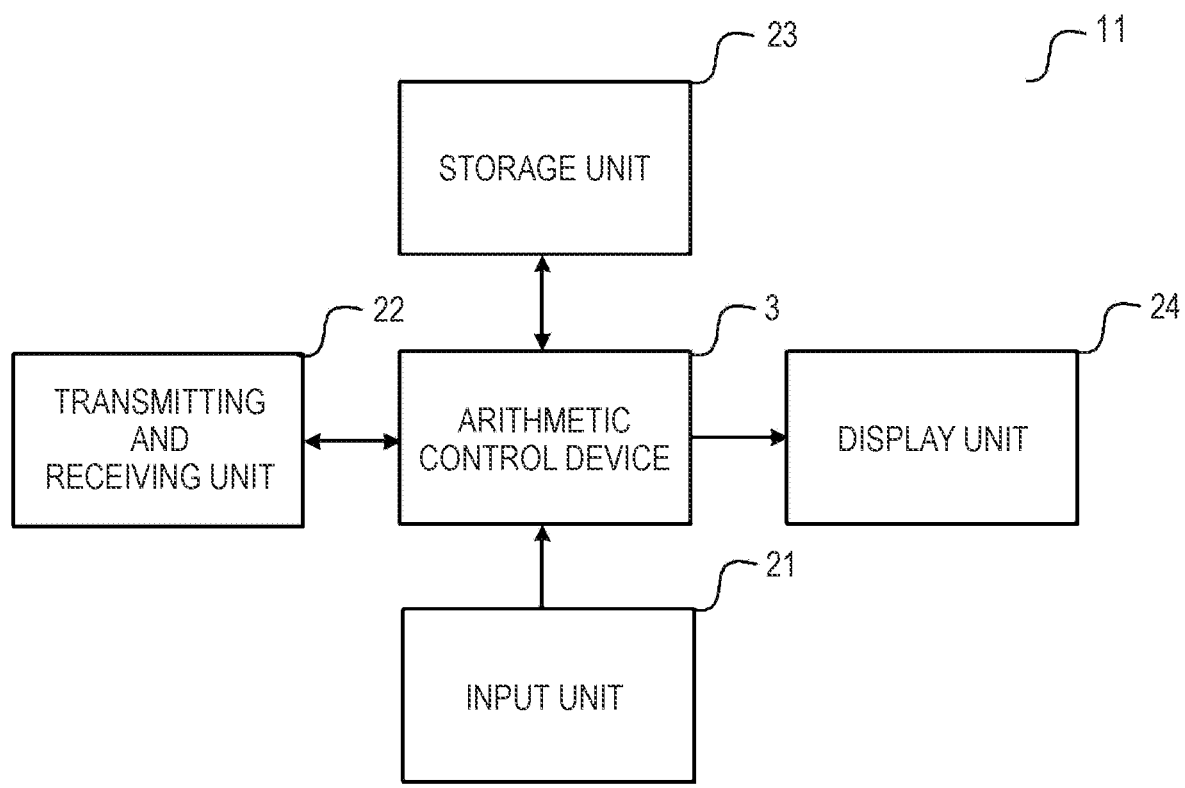
FIG. 2 is a configuration diagram illustrating a configuration example of an operation monitoring device according to one or more embodiments of the present invention.

Hereinafter, a process control system 1 in a plant according to one or more embodiments of the present invention is described in detail with reference to drawings. FIG. 1 illustrates an overview of controllers 131 to 133, input and output modules (referred to as "I/O modules 141 to 143" hereinafter), field devices 151 to 153, 161 to 163, and a process control system in a plant, and FIG. 2 illustrates a configuration example of an operation monitoring device 11 according to one or more embodiments of the present invention.

In FIG. 1, the process control system 1 in a plant is configured such that the operation monitoring device 11 and an engineering terminal 4 are connected to the controllers 131 to 133, the I/O modules 141 to 143, and the field devices 151 to 153, 161 to 163 (for example, a sensor device such as a flowmeter and a temperature sensor, a valve device such as a flow control valve and an opening and closing valve, an actuator device such as a fan and a motor, and other devices installed in the plant) via a control network 12.

In the above process control system 1, the controllers 131 to 133 control the plurality of field devices 151 to 153, 161 to 163 via the control network 12 from the operation monitoring device 11, thereby realizing process control in the plant.

In one or more embodiments of the present invention, the controllers 131 to 133 control the field devices 151 to 153, 161 to 163. And, configuration information from the controllers 131 to 133, the I/O modules 141 to 143, and the field devices 151 to 153, 161 to 163 is collected at a cycle (for example, once a week or once a month) different from that of the process control.

FIG. 2 illustrates a configuration example of the operation monitoring device 11 that collects the configuration information acquired from the controllers 131 to 133, the I/O modules 141 to 143, and the field devices 151 to 153, 161 to 163 in the process control system 1 and that updates the configuration information in a storage unit 23. The operation monitoring device 11 according to one or more embodiments of the present invention includes an input unit 21, a transmitting and receiving unit 22, the storage unit 23, a display unit 24, and an arithmetic control device 3.

The input unit 21 inputs an extraction condition related to history configuration information to be described below. The input unit 21 also selects list information related to the history configuration information to be described below, and sets a collection range for configuration information. Here, examples of the input unit 21 include an input device such as a keyboard, a mouse, and a screen panel.

The transmitting and receiving unit 22 transmits an instruction to collect configuration information to devices constructing the process control system 1, and receives configuration information from the devices.

The transmitting and receiving unit 22 is connected to a network cable and the input unit 21, such as a network interface and a USB connection port, respectively. The storage unit 23 stores configuration information collected from devices to be described below. Additionally, the storage unit 23 may exist on a local network or on a network via the Internet.

The display unit 24 displays an extraction condition related to history configuration information to be described below. The display unit 24 also displays the list information related to the history configuration information to be described below.

Figure 3:
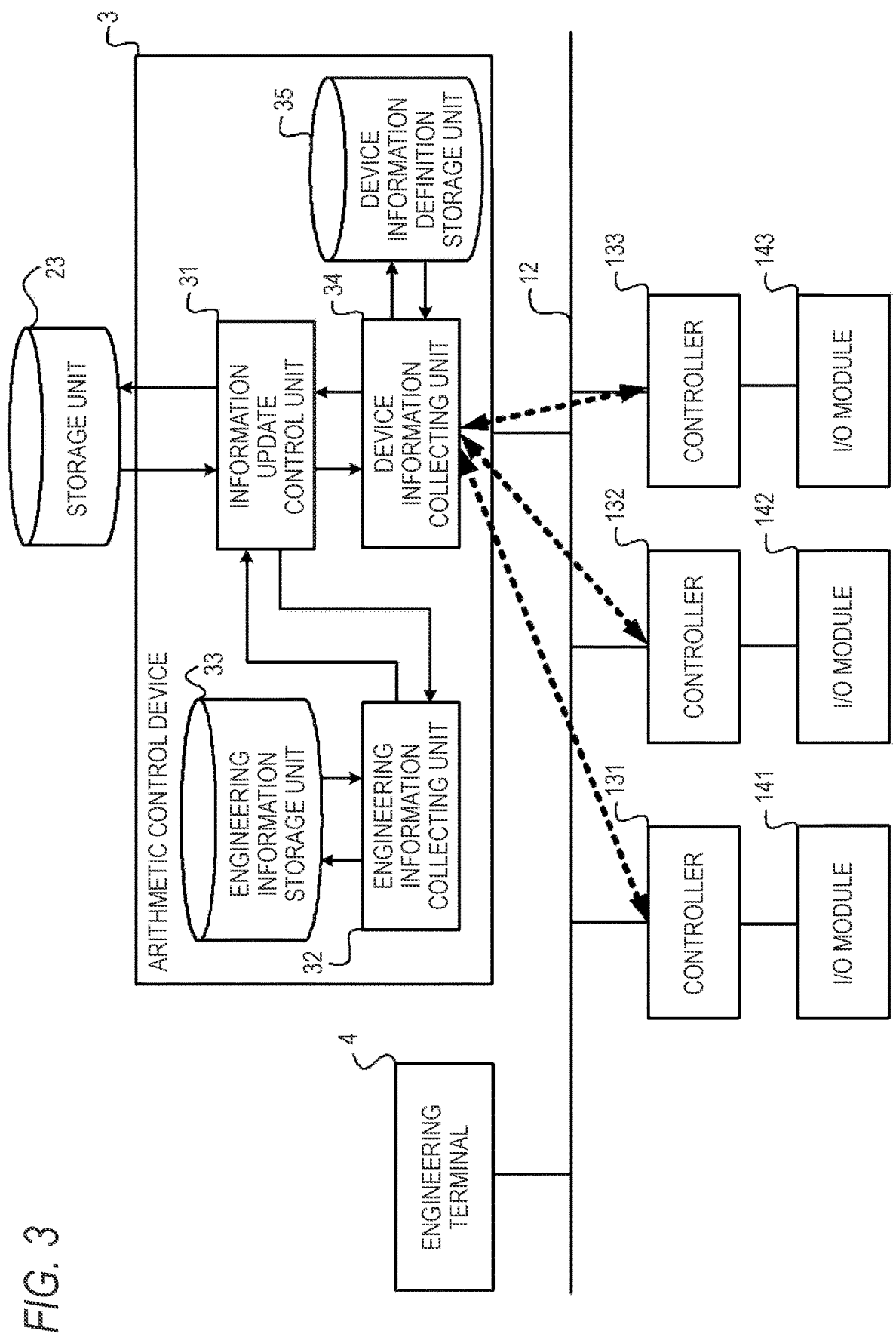
FIG. 3 is a configuration diagram illustrating a configuration example of an arithmetic control device according to one or more embodiments of the present invention.

Configuration Example of Configuration Information Collecting Function of Arithmetic Control Device According to Present Invention FIG. 3 illustrates a configuration example of a configuration information collecting function of the arithmetic control device (arithmetic controller) 3 in FIG. 2. The arithmetic control device 3 according to one or more embodiments of the present invention includes an information update control unit 31, an engineering information collecting unit 32, an engineering information storage unit 33, a device information collecting unit 34, and a device information definition storage unit 35.

The information update control unit 31 collects engineering information and device information via the engineering information collecting unit 32 and the device information collecting unit 34, and updates the information in the storage unit 23. Here, the update refers to overwriting and saving configuration information in the storage unit 23. The information update control unit 31 also transmits an instruction to collect configuration information to the engineering information collecting unit 32 and the device information collecting unit 34 to be described below. Details of the information update control unit 31 are described below.

Upon receiving the instruction to collect configuration information from the information update control unit 31, the engineering information collecting unit 32 extracts engineering information (for example, a model name and a connection position of a device) from the engineering information storage unit 33 to be described later when the configuration information is generated. The engineering information collecting unit 32 also transmits the engineering information extracted from the engineering information storage unit 33 to the information update control unit 31. Additionally, when the engineering information stored in the engineering information storage unit 33 is in a shortage, the engineering information collecting unit 32 may also utilize specification information of a device and may extract information. A detailed configuration and operation of the engineering information collecting unit 32 are described below.

The engineering information storage unit 33 stores information that is set when the process control system 1 is constructed using the engineering terminal 4. The engineering information refers to, for example, connection information between devices, a model name of a device, and tag information set in a device.

Although the engineering information storage unit 33 is configured in the arithmetic control device 3 in FIG. 3, the present invention is not limited thereto. The engineering information storage unit 33 may also be configured separately from the arithmetic control device 3, and the engineering information may also be stored in the storage unit 23. At this time, the engineering information storage unit 33 may be a storage medium such as a USB or a server installed locally.

Upon receiving the instruction to collect configuration information from the information update control unit 31, the device information collecting unit 34 extracts device information (for example, a serial number, a type of software, and license information) indicating specification information of each device, specification information of software constituting the device, or a combination of both via the control network 12 and a field network when configuration information related to a device such as the controller 131, the I/O module 141, the field device 151 and a Human Machine Interface (HMI) is generated.

The device information collecting unit 34 also determines whether necessary information can be correctly acquired from the device based on a definition stored in the device information definition storage unit 35 to be described below. If not, the device information collecting unit 34 transmits an instruction to retransmit device information to the device based on the determination result. If yes, the device information collecting unit 34 transmits the collected information to the information update control unit 31. A detailed configuration and operation of the device information collecting unit 34 are described below.

The device information definition storage unit 35 stores definition information related to a type of information possessed in a device. Examples of information defined as information possessed by the controller 131 includes a name of a module (the I/O module 141, a power supply module, a base plate, and the like) connected to the controller 131, version information of a device, and the like.

Although the device information definition storage unit 35 is configured in the arithmetic control device 3 in FIG. 3, the present invention is not limited thereto. The device information definition storage unit 35 may also be configured separately from the arithmetic control device 3, and a definition of device information may be stored in the storage unit 23. At this time, the device information definition storage unit 35 may be a storage medium such as a USB or a server installed locally.

The device information definition storage unit 35 may also not be configured in the arithmetic control device 3. At this time, the engineering information collecting unit 32 may also collect engineering information before the device information collecting unit 34 collects device information, so that the device information collecting unit 34 may collect device information based on the engineering information as definition information.

Figure 4:
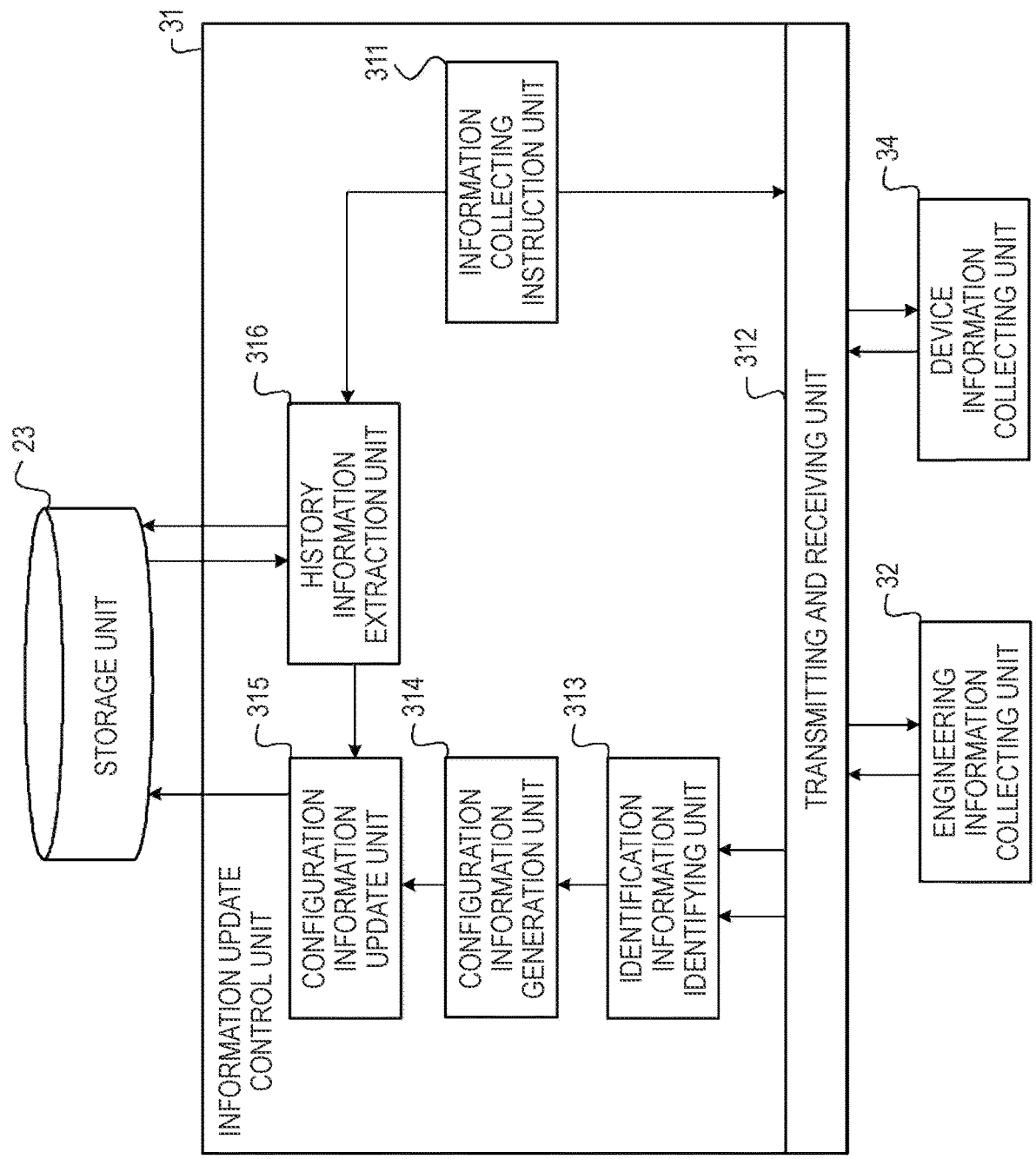
FIG. 4 is a configuration diagram illustrating a configuration example of an information update control unit according to one or more embodiments of the present invention.

Configuration Example of Information Update Control Unit According to Present Invention FIG. 4 illustrates a configuration example of the information update control unit 31 in FIG. 3. The information update control unit 31 according to one or more embodiments of the present invention includes an information collecting instruction unit 311, a transmitting and receiving unit 312, an identification information identifying unit 313, a configuration information generation unit 314, a configuration information update unit 315, and a history information extraction unit 316.

The information collecting instruction unit 311 transmits an instruction to collect engineering information and device information to the engineering information collecting unit 32 and the device information collecting unit 34 via the transmitting and receiving unit 312 when configuration information is generated.

Here, the information collecting instruction unit 311 extracts via the input unit 21 and a search unit (not illustrated) such as a device that collects information from configuration information stored in the storage unit 23, and sets in advance a correction range (a target device to be collected and/or a target type of a device) to be collected of information based on the extracted result. When setting the range to be collected of information, configuration information that is the extracted result is displayed on the display unit 24 as a list, so that a user can select configuration information necessary for update and can set the range to be collected of information. This is because that loads on the operation monitoring device 11 increase when configuration information is collected at one time since hundreds of thousands of controllers 131 and field devices 151 are installed in the process control system 1. Therefore, configuration information can be collected by selecting only a device to which replacement has occurred due to, for example, failure of the device.

Upon transmitting the instruction to collect engineering information and device information to the engineering information collecting unit 32 and the device information collecting unit 34, the information collecting instruction unit 311 transmits, to the history information extraction unit 316 to be described below, an instruction to extract configuration information stored in the storage unit 23 in a preset collection range for configuration information. Additionally, timing of the instruction to collect information and timing of the instruction to extract configuration information may be the same, or the instruction to extract configuration information may be set first.

The transmitting and receiving unit 312 transmits the instruction to collect engineering information and device information from the information collecting instruction unit 311 to the engineering information collecting unit 32 and the device information collecting unit 34, and receives information (engineering information and device information) necessary for generating configuration information collected from the engineering information collecting unit 32 and the device information collecting unit 34. Upon collecting engineering information and device information from the engineering information collecting unit 32 and the device information collecting unit 34, the transmitting and receiving unit 312 transmits the information to the identification information identifying unit 313. Contents of the identification information are described below.

The identification information identifying unit 313 confirms identification information defined in the engineering information and the device information transmitted from the transmitting and receiving unit 312. Here, in each device, the identification information of the engineering information is set to be the same as the identification information of the device information, based on a definition to be described below. Upon confirming the same identification information in the engineering information and the device information of each device, the identification information identifying unit 313 transmits the engineering information and the device information to the configuration information generation unit 314. Details will be described below.

The configuration information generation unit 314 combines the engineering information and the device information, in which at least a part of the same identification information is set, based on the configuration information set in the engineering information and the device information confirmed by the identification information identifying unit 313, and generates configuration information. The configuration information generation unit 314 transmits the generated configuration information to the configuration information update unit 315.

The configuration information update unit 315 updates the configuration information received from the configuration information generation unit 314 to configuration information before update related to a device within a preset range that is extracted by the history information extraction unit 316 to be described below.

FIG. 5 illustrates examples of configuration information of the controller 131 and configuration information of the HMI. Although the configuration information is described in a matrix structure in FIG. 5, it may not be of a matrix structure.

As the configuration information of the controller 131, the vertical axis represents the I/O module (IOM) 141 connected to the controllers 131, and the horizontal axis represents a model number, a serial number, and software information of the I/O module 141. Additionally, the configuration information described in the horizontal axis is not limited to those described above, and includes such as information on a connection position, version information, and license information of the I/O module 141.

As the configuration information of the HMI, the vertical axis represents a name of software downloaded to the HMI, and the horizontal axis represents a model number. Additionally, the configuration information described in the horizontal axis is not limited to those described above, and includes software information and version information of the software.

The configuration information update unit 315 updates configuration information by inputting engineering information in the solid line part of the configuration information of the controller 131 and of the HMI in FIG. 5 into the matrix, and inputting device information in the broken line part of the configuration information of the controller 131 and of the HMI in FIG. 5 into the matrix.

Upon receiving an instruction to extract configuration information before update from the information collecting instruction unit 311, the history information extraction unit 316 extracts, from the storage unit 23, configuration information related to the collection range defined by the information collecting instruction unit 311. The history information extraction unit 316 transmits the extracted configuration information before update to the configuration information update unit 315.

Figure 6:
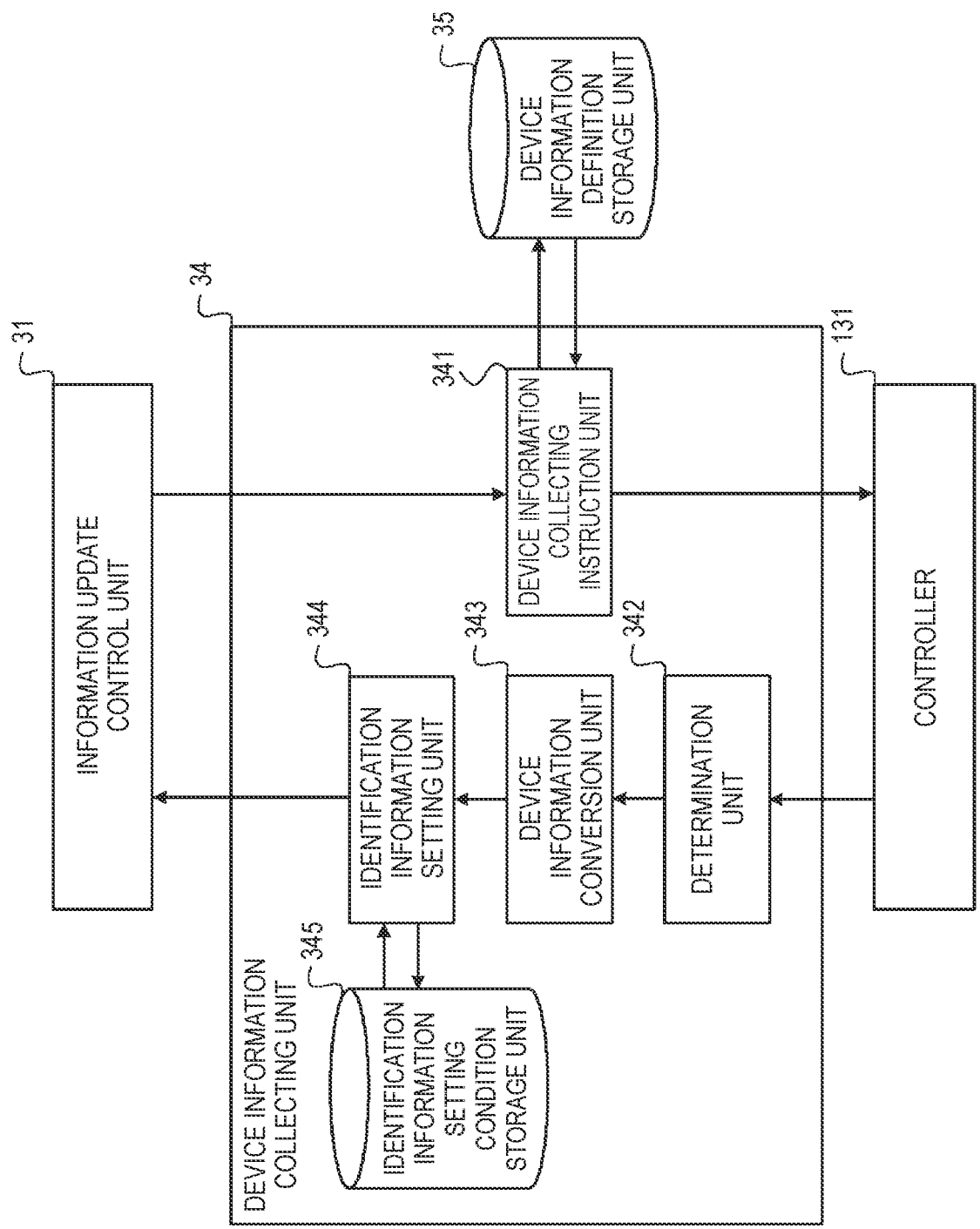
FIG. 6 is a configuration diagram illustrating a configuration example of a device information collecting unit according to one or more embodiments of the present invention.

Configuration Example of Device Information Collecting Unit According to Present Invention FIG. 6 illustrates a configuration example of the device information collecting unit 34 in FIG. 3. The device information collecting unit 34 according to one or more embodiments of the present invention includes a device information collecting instruction unit 341, a determination unit 342, a device information conversion unit 343, an identification information setting unit 344, and an identification information setting condition storage unit 345.

Upon receiving an instruction to collect device information from a device such as the controller 131 from the information update control unit 31, the device information collecting instruction unit 341 inputs, into the device, an instruction to transmit the device information to the device information collecting unit 34. Here, when transmitting an instruction to the device, the device information collecting instruction unit 341 confirms with the device information definition storage unit 35 that stores type information of device information possessed by each device. For example, device information of the controller 131 includes information on a type of a connected module (the I/O module 141, a power supply module, and a base plate), and on a position of the connected I/O module 141. The device information collecting instruction unit 341 can acquire device information of each device without fail by confirming and collecting the device information possessed by each device.

The device information definition storage unit 35 may also not be configured in the arithmetic control device 3. At this time, the engineering information collecting unit 32 may also collect engineering information before the device information collecting unit 34 collects device information, so that the device information collecting unit 34 may collect device information based on the engineering information as definition information.

The determination unit 342 compares device information transmitted from each device with device information possessed by each device, and determines whether the device information can be appropriately acquired from the device. The determination unit 342 stores the determination result in the device information, and transmits the device information to the device information conversion unit 343.

The determination result is output in three forms: acquisition success, acquisition failure, and ignorance.

The acquisition success represents a determination result indicating that the device information transmitted from each device can be correctly collected.

The acquisition failure represents a determination result indicating that no device information can be acquired or a part of the device information cannot be acquired due to a network communication failure.

The ignorance refers to a determination result indicating that, instead of determining the acquisition failure, the device information before update stored in the storage unit 23 is maintained even when the device information cannot be acquired. Additionally, there are examples of cases where the device information cannot be acquired such as a case where the device information cannot be acquired since an abnormality occurs on one side of the duplicated I/O module 141 connected to the controller 131, and a case where the device information cannot be acquired since a PC is stopped functioning due to license acquisition and update.

The device information conversion unit 343 converts the device information that stores the determination result received from the determination unit 342 into a format in which configuration information can be generated by the information update control unit 31. This is because the device information possessed by each device is different in format. The device information conversion unit 343, when converting the format of the device information, transmits the device information to the identification information setting unit 344.

Upon receiving the device information from the device information conversion unit 343, the identification information setting unit 344 sets identification information in the device information based on an identification information setting condition stored in the identification information setting condition storage unit 345 to be described below. Upon setting identification information in the device information, the identification information setting unit 344 transmits the device information to the information update control unit 31. The condition for setting identification information is described below.

The identification information setting condition storage unit 345 stores the condition for setting identification information in device information by the identification information setting unit 344. The setting condition is defined by a hierarchical structure in which a plurality of I/O modules 141 are connected to the controller 131 and field devices 151 are connected to the I/O modules 141.

For example, identification information set in the controller 131 includes a name of a Project in which the controller 131 is installed and a name of the controller 131. Specifically, "PJT0001¥STN0101" is set as the identification information.

Identification information set in the I/O modules 141 includes a name of a Project in which the controller 131 is installed, a name of the controller 131, a type of the I/O, a name of a node, and a model name of the I/O modules 141. Specifically, "PJT0001¥STN0101¥FIO¥Node1¥4SDV144" is set as the identification information.

Additionally, a condition that is the same as a setting condition possessed by the engineering information collecting unit 32 is stored as an identification condition.

Figure 7:
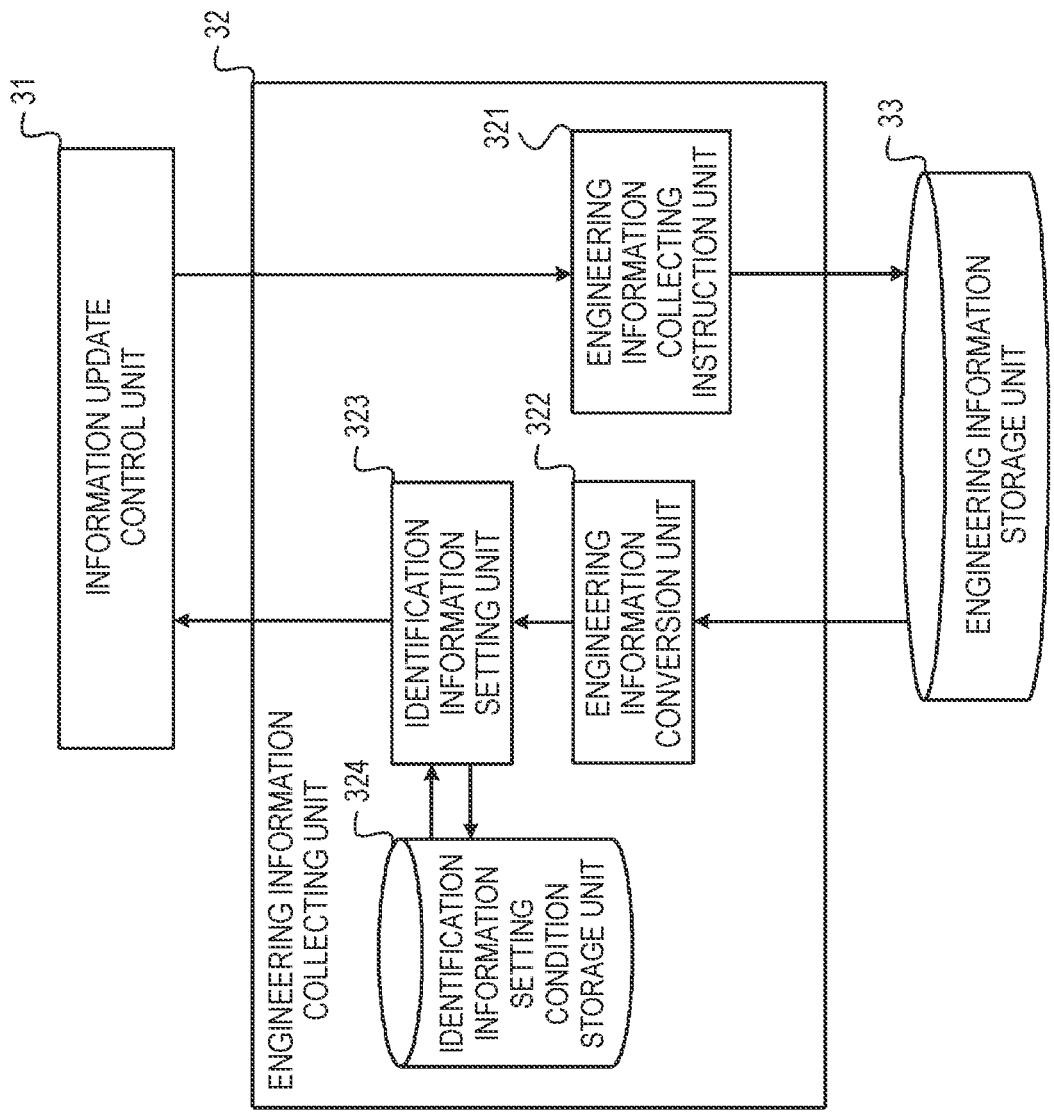
FIG. 7 is a configuration diagram illustrating an example of an engineering information collecting unit according to one or more embodiments of the present invention.

Configuration Example of Engineering Information Collecting Unit According to Present Invention FIG. 7 illustrates a configuration example of the engineering information collecting unit 32 in FIG. 3. The engineering information collecting unit 32 of the present invention includes an engineering information collecting instruction unit 321, an engineering information conversion unit 322, an identification information setting unit 323, and an identification information setting condition storage unit 324.

Upon receiving, from the information update control unit 31, an instruction to collect engineering information from the engineering information storage unit 33, the engineering information collecting instruction unit 321 inputs, to the engineering information storage unit 33, an instruction of transmitting the engineering information to the engineering information collecting unit 32.

The engineering information conversion unit 322 converts the engineering information received from the engineering information storage unit 33 into a format in which configuration information can be generated by the information update control unit 31. This is because the engineering information stored in the engineering information storage unit 33 is stored in different formats. The engineering information conversion unit 322, when converting the format of the engineering information, transmits the device information to the identification information setting unit 323.

Upon receiving the engineering information from the engineering information conversion unit 322, the identification information setting unit 323 sets identification information in the engineering information based on an identification information setting condition stored in the identification information setting condition storage unit 324 to be described below. Upon setting identification information in the engineering information, the identification information setting unit 323 transmits the engineering information to the information update control unit 31. The condition for setting the identification information is similar to the identification information setting condition related to the device information.

The identification information setting condition storage unit 324 stores the condition for setting identification information in engineering information by the identification information setting unit 323. The setting condition is similar to the setting condition set in the device information. That is, the setting condition is defined by a hierarchical structure in which a plurality of I/O modules 141 are connected to the controller 131 and the field devices 151 are connected to the I/O modules 141.

The engineering information collecting unit 32 may also be combined with the device information collecting unit 34 to form one collecting unit since the engineering information collecting unit 32 has a similar function as that of the device information collecting unit 34.

Method for Collecting and Updating Configuration Information

Figure 8:
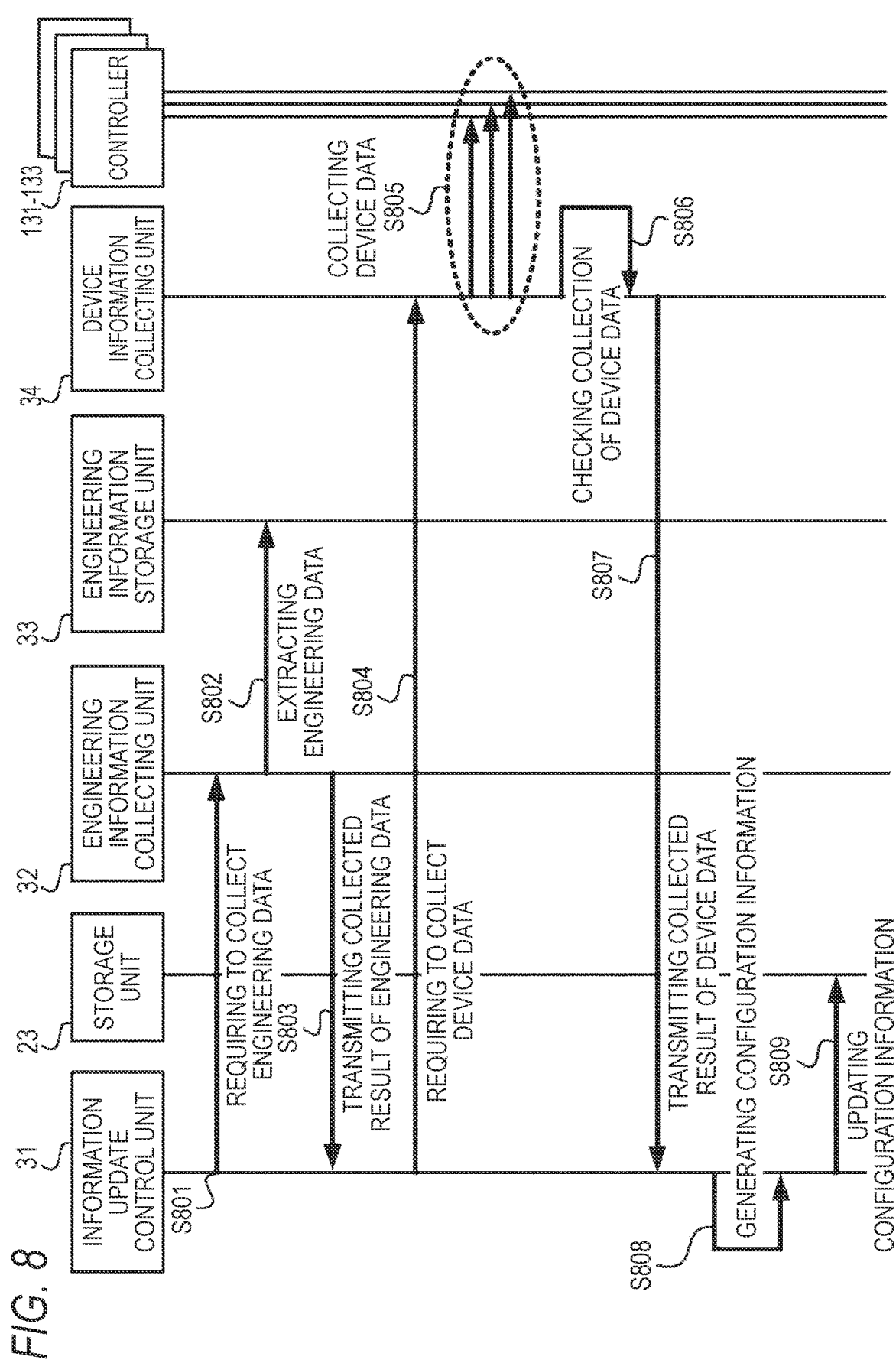
FIG. 8 is a flowchart illustrating an example of collecting and updating configuration information in the arithmetic control device of the present invention.

FIGS. 3, 4, 6, and 7 illustrate configuration examples of the information update control unit 31, the device information collecting unit 34, and the engineering information collecting unit 32, included in the arithmetic control device 3 according to one or more embodiments of the present invention. Accordingly, a specific method for collecting and updating configuration information using the information update control unit 31, the device information collecting unit 34, and the engineering information collecting unit 32 is described below. FIG. 8 illustrates a flow chart for collecting and updating configuration information by the information update control unit 31, the engineering information collecting unit 32, and the device information collecting unit 34.

Although operation of acquiring configuration information from the controller 131 is described below as an example, the present invention is not limited thereto, and the configuration information can also be collected from the HMI, the I/O module 141, and the field device 151.

In Step S801, the information update control unit 31 transmits, to the engineering information collecting unit 32, an instruction to collect engineering information from the engineering information storage unit 33 (Step S801). Detailed operation for the information update control unit 31 to transmit the instruction to the engineering information collecting unit 32 in Step S801 is described below.

In Step S802, upon receiving the instruction to collect engineering information from the information update control unit 31, the engineering information collecting unit 32 extracts engineering information from the engineering information storage unit 33 (Step S802). Here, operation for the engineering information collecting unit 32 to collect engineering information from the engineering information storage unit 33 is described with reference to FIG. 7.

When the engineering information collecting unit 32 receives the instruction to collect engineering information from the information update control unit 31, the engineering information collecting instruction unit 321 extracts engineering information to be updated from the engineering information storage unit 33. When extracting engineering information from the engineering information storage unit 33, the engineering information is extracted based on a preset collection range for configuration information.

Next, the engineering information conversion unit 322 converts the engineering information extracted from the engineering information storage unit 33 into a format in which configuration information can be generated by the information update control unit 31. This is because the engineering information stored in the engineering information storage unit 33 has a different storage format for respective engineering information. The engineering information conversion unit 322, upon converting the engineering information, transmits the information to the identification information setting unit 323.

The identification information setting unit 323 sets identification information in the engineering information based on a setting condition stored in the identification information setting condition storage unit 324. The setting condition is defined by a hierarchical structure in which a plurality of I/O modules 141 are connected to the controller 131 and field devices 151 are connected to the I/O modules 141.

For example, identification information set in the controller 131 includes a name of a Project in which the controller 131 is installed and a name of the controller 131. Specifically, "PJT0001¥STN0101" is set as the identification information.

Further, identification information set in the I/O modules 141 refers to a name of a Project in which the controller 131 is installed, a name of the controller 131, a type of the I/O, a name of a node, and a model name of the I/O modules 141. Specifically, "PJT0001¥STN0101¥FIO¥Node¥4SDV144" is set as the identification information.

In Step S803, the engineering information collecting unit 32 transmits engineering information in which identification information is set by the above method, to the information update control unit 31 (Step S803).

In Step S804, the information update control unit 31 transmits, to the device information collecting unit 34, an instruction to extract device information from the controller 131 based on a preset collection range (Step S804).

In Step S805, the device information collecting unit 34 outputs, to a device, an instruction to transmit device information to the device information collecting unit 34, based on the instruction received from the information update control unit 31 (Step S805). In Step S805, the device information collecting unit 34 may also output, to a plurality of controllers 131, instructions to transmit device information based on a preset collection range, and may also input a plurality of pieces of device information at once. At this time, the controllers 131 may divide the device information within a range where communication for performing process control is not affected, and may input the device information.

In Step S806, the device information collecting unit 34 determines whether the device information input from the controller 131 is appropriately input (Step S806). Here, operation of the device information collecting unit 34 to collect device information from the device and operation of determining whether the collected device information can be appropriately collected are described with reference to FIG. 6.

When the device information collecting unit 34 receives the instruction to collect device information from the information update control unit 31, the device information collecting instruction unit 341 extracts device information from the device. When extracting device information from the controller 131, the device information is extracted based on the preset collection range for configuration information. At this time, the device information collecting instruction unit 341 confirms definitions of device information possessed by each device that are stored in the device information definition storage unit 35, and extracts the device information from the controller 131.

Next, the determination unit 342 compares the device information extracted from the controller 131 with the device information possessed by the controller 131, and determines whether the device information can be appropriately acquired from the controller 131. The determination unit 342 stores the determination result in the device information, and transmits the device information to the device information conversion unit 343. Additionally, the determination result includes three types of the above acquisition success, acquisition failure, and ignorance.

When the determination result is acquisition success, the determination unit 342 stores the determination result in the device information, and transmits the device information to the device information conversion unit 343. When the determination result is acquisition failure, the device information collecting instruction unit 341 extracts device information for another time. When the determination result is ignorance (specifically, when the I/O module 141 connected to the controller 131 is made redundant and an abnormality occurs to the I/O module 141, and the like), the determination unit 342 stores the determination result in the device information, in other words, the determination unit 342 adds the determination result to the device information, and transmits the device information to the device information conversion unit 343.

Further, the device information conversion unit 343 converts the device information extracted from the controller 131 into a format in which configuration information can be generated by the information update control unit 31. This is because the device information possessed by the controllers 131 is different in format. The device information conversion unit 343, upon converting the device information, transmits the device information to the identification information setting unit 344.

Next, the identification information setting unit 344 sets identification information in the device information based on a setting condition stored in the identification information setting condition storage unit 345. The setting condition is defined by a hierarchical structure in which a plurality of I/O modules 141 are connected to the controller 131 and the field devices 151 are connected to the I/O modules 141. Additionally, conditions for setting identification information possessed by the device information collecting unit 34 and the engineering information collecting unit 32 are separately set and defined in similar manners.

In Step S807, the device information collecting unit 34 transmits the device information collected and determined in Step S805 to the information update control unit 31.

Figure 9:
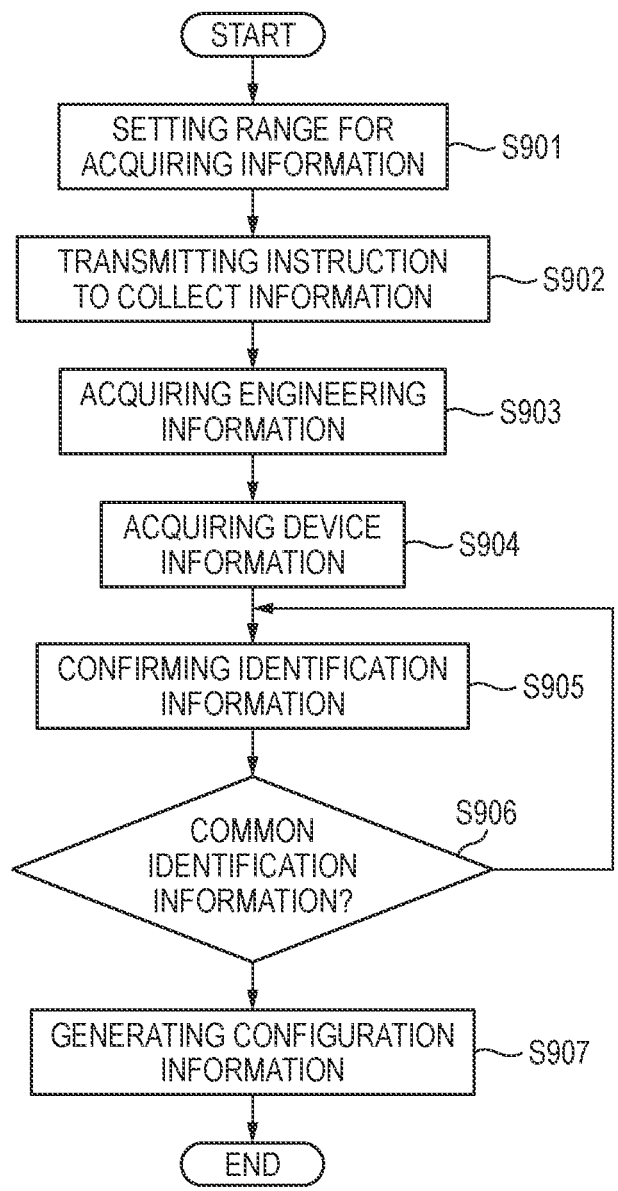
FIG. 9 is a flowchart illustrating an exemplary operation of the information update control unit of the present invention.

In Step S808, the information update control unit 31 generates configuration information based on information received from the engineering information collecting unit 32 and the device information collecting unit 34 (Step S808). Here, operation of the information update control unit 31 to generate configuration information is described with reference to the flowchart in FIG. 9.

Operation in Generating Configuration Information

Before proceeding to Step S901, the user inputs, in advance in a search unit (not illustrated), a name of a device that collects configuration information, via the input unit 21 of the operation monitoring device 11. The search unit outputs, to the display unit 24, among configuration information stored in the storage unit 23, configuration information related to the input device as a list. The user selects configuration information to be updated from the list of configuration information.

In Step S901, the information update control unit 31 sets in advance a collection and update range based on the selected configuration information that the user desires to update (Step S901). In Step S901, the collection and update range may be set to a type of a device or an area where the device is installed.

In Step S902, the information collecting instruction unit 311 transmits an instruction to collect information to the engineering information collecting unit 32 and the device information collecting unit 34 based on the collection and update range set in Step S901 (Step S902). In Step S902, the instruction to the engineering information collecting unit 32 and the device information collecting unit 34 may be the same or different in timing.

In Step S903, the transmitting and receiving unit 312 receives engineering information from the engineering information collecting unit 32 (Step S903).

In Step S904, the transmitting and receiving unit 312 receives device information from the device information collecting unit 34 (Step S904).

In Steps S903 and S904, the received engineering information and device information are transmitted to the identification information identifying unit 313.

In Step S905, the identification information identifying unit 313 confirms identification information set in the received engineering information and device information (Step S905).

In Step S906, the identification information identifying unit 313 determines whether the identification information of the engineering information and the identification information of the device information, which are confirmed in Step S905, are common identification information (Step S906). If yes, the engineering information and the device information in which common identification information is set are transmitted to the configuration information generation unit 314. If no, the identification information identifying unit 313 does not transmit the engineering information and the device information in which identification information is set to the configuration information generation unit 314, or the identification information identifying unit 313 collects device information for another time.

In Step S907, upon determining in Step S906 that the two pieces of identification information are common, the configuration information generation unit 314 combines the engineering information and the device information and generates configuration information (Step S907). In Step S907, the configuration information generation unit 314 generates the configuration information by inputting the solid line part of the matrix in FIG. 5 based on the engineering information and inputting the broken line part of the matrix in FIG. 5 based on the device information.

In Step S809, when generating configuration information in Step S808, the information update control unit 31 updates the configuration information in the storage unit 23. Additionally, the update refers to overwriting the configuration information before update and saving the configuration information in the storage unit 23.

Additionally, when the information update control unit 31 updates the configuration information in Step S809, the engineering information acquired in Step S803 may be updated in the storage unit, and then the device information acquired in Step S807 may be updated in the storage unit based on the identification information.

In this way, according to one or more embodiments of the present invention, since the arithmetic control device 3 described herein includes the information update control unit 31, the engineering information collecting unit 32, and the device information collecting unit 34, configuration management information related to the controller 131, the I/O module 141, and the field device 151 that construct the process control system 1 can be appropriately acquired, and configuration information related to devices constituting the process control system 1 can be acquired without checking the devices directly by such as a maintenance staff.

Although embodiments of the present invention have been described in detail with reference to the drawings, specific configurations are not limited to the above embodiments, and designs within the scope of the invention are also included. For example, functions described in the above embodiments can be optionally combined.

What is claimed is:

1. An information collecting device for controlling a plant based on process data acquired from controllers and field devices connected to the controllers, the information collecting device comprising:
    an input device that comprises a display panel displaying a list of pieces of stored device information;
    a central processing unit (CPU) that:
        receives a user input to select a piece of stored device information to be updated from the list via the input device,
        sets a collection range of first and second device information based on the piece of stored device information selected from the list, wherein the collection range is specified by the user input and indicates a type or an installation area of at least one of the controllers or the field devices that require update of the piece of stored device information,
        based on the collection range, collects a plurality of pieces of first device information of the plant obtained from a first storage,
        sets first identification information for identifying each piece of the first device information,
        based on the collection range, collects a plurality of pieces of second device information obtained from one of the controllers, one of the field devices, or a combination of both selected from the controllers and the field devices,
        sets second identification information for identifying each piece of the second device information,
        when the first and the second identification information are common,
            generates, based on a definition that specifies a piece of the first device information from among the collected pieces of first device information and specifies a piece of the second device information from among the collected pieces of second device information, combined device information including the piece of the first device information and the piece of the second device information, and
            updates the piece of stored device information in a second storage using the combined device information based on a preset update cycle, and
        when the first and the second identification information are not common,
            either collects another piece of second device information for another time or refrains from generating the combined device information.

2. The information collecting device according to claim 1, wherein the CPU:
    determines whether collection of the pieces of the second device information is successful or unsuccessful, and generates a collection success result or a collection failure result,
    when determining that the collection is unsuccessful, determines whether to use or ignore the collection failure result and generates a determination result indicating whether to use or ignore the collection failure result, and
    adding the collection success result or the determination result to ignore to the pieces of the second device information.

3. The information collecting device according to claim 2, wherein
    the collection success result indicates that the pieces of the second device information are successfully collected,
    the determination result to use indicates that at least a part of the pieces of the second device information is not collected and the collection failure result is used, and
    the determination result to ignore indicates that at least a part of the pieces of the second device information is not collected but the collection failure result is ignored, and that the piece of stored device information is maintained in the second storage without being updated.

4. The information collecting device according to claim 1, wherein
    the pieces of second device information include at least one of a serial number, a type of software, license information, connection information or position information between the controller and the field device.

5. The information collecting device according to claim 1, wherein the CPU generates the combined device information by combining the piece of the first device information and the piece of the second device information upon identifying that at least a part of the same identification information is set in both of the first and second identification information.

6. The information collecting device according to claim 1, wherein the CPU sets the collection range of the first and second device information based on at least one of a target device and a target type of a device.

7. The information collecting device according to claim 1, wherein the pieces of first device information include at least one of a model name and a connection position of at least one of the controllers, one of the field devices, or a combination of both selected from the controllers and the field devices.

8. The information collecting device according to claim 1, wherein the first device information has a first format and the second device information has a second format, the CPU converts the first format to a first converted format and converts the second format to a second converted format, and each of the first converted format and the second converted format is a format in which the combined device information can be generated.

9. The information collecting device according to claim 1, further comprising:

a first memory that stores first identification information setting condition; and a second memory that stores second identification information setting condition, wherein the CPU:

sets the first identification information for identifying each piece of the first device information based on the first identification information setting condition stored in the first memory, and sets the second identification information for identifying each piece of the second device information based on the second identification information setting condition stored in the second memory.

10. A method for collecting information in an information collecting device that comprises a central processing unit (CPU) and controls a plant based on process data acquired from controllers and field devices connected to the controllers, the method comprising:

displaying, on a display panel of an input device, a list of pieces of stored device information;

receiving, via the input device, a user input to select a piece of stored device information to be updated from the list, setting a collection range of first and second device information based on the piece of stored device information selected from the list, wherein the collection range is specified by the user input and indicates a type or an installation area of at least one of the controllers or the field devices that require update of the piece of stored device information, based on the collection range, collecting a plurality of pieces of first device information of the plant obtained from a first storage;

setting first identification information for identifying each piece of the first device information;

based on the collection range, collecting a plurality of pieces of second device information obtained from a controller, a field device, or a combination of both selected from the controllers and the field devices;

setting second identification information for identifying each piece of the second device information;

when the first and the second identification information are common, generating, based on a definition that specifies a piece of the first device information from among the collected pieces of first device information and specifies a piece of the second device information from among the collected pieces of second device information, combined device information including the piece of the first device information and the piece of the second device information, and updating the piece of stored device information in a second storage using the combined device information based on a preset update cycle; and when the first and the second identification information are not common, either collecting another piece of second device information for another time or refraining from generating the combined device information.

* * * * *